(12) United States Patent
Kittelsen et al.

(10) Patent No.: US 8,386,371 B2
(45) Date of Patent: Feb. 26, 2013

(54) METHOD AND SYSTEM FOR CANCELING ORDERS FOR FINANCIAL ARTICLES OF TRADES

(75) Inventors: Douglas G. Kittelsen, Evergreen, CO (US); Lee Arthur Cole, Evergreen, CO (US); John Kain, New York, NY (US)

(73) Assignee: FTEN, Inc., New York, NY (US)

( * ) Notice: Subject to any disclaimer, the term of this patent is extended or adjusted under 35 U.S.C. 154(b) by 0 days.

(21) Appl. No.: 13/018,014

(22) Filed: Jan. 31, 2011

(65) Prior Publication Data

US 2011/0225081 A1  Sep. 15, 2011

Related U.S. Application Data

(60) Provisional application No. 61/300,667, filed on Feb. 2, 2010.

(51) Int. Cl.
*G06Q 40/00* (2012.01)
(52) U.S. Cl. ............................ 705/37; 705/35; 705/36 R
(58) Field of Classification Search ........................ None
See application file for complete search history.

(56) References Cited

U.S. PATENT DOCUMENTS

| | | | | |
|---|---|---|---|---|
| 5,168,446 A * | 12/1992 | Wiseman | ........................ | 705/37 |
| 5,893,091 A | 4/1999 | Hunt et al. | | |
| 6,314,468 B1 * | 11/2001 | Murphy et al. | ............... | 709/236 |
| 6,532,460 B1 * | 3/2003 | Amanat et al. | .............. | 705/36 R |
| 6,763,384 B1 * | 7/2004 | Gupta et al. | .................. | 709/224 |
| 6,957,199 B1 * | 10/2005 | Fisher | .............................. | 705/78 |
| 7,035,819 B1 * | 4/2006 | Gianakouros et al. | ........... | 705/37 |
| 7,096,494 B1 * | 8/2006 | Chen | .................................. | 726/9 |
| 7,107,240 B1 * | 9/2006 | Silverman et al. | ............... | 705/37 |
| 7,310,620 B2 * | 12/2007 | Moore et al. | ..................... | 705/75 |
| 7,430,533 B1 * | 9/2008 | Cushing | .......................... | 705/37 |
| 7,512,557 B1 * | 3/2009 | Fishbain et al. | ............ | 705/36 R |
| 7,584,141 B1 | 9/2009 | Andrews | | |
| 7,624,063 B1 * | 11/2009 | Andrews | .......................... | 705/37 |
| 7,668,767 B1 * | 2/2010 | Borsand | .......................... | 705/35 |
| 7,778,915 B2 | 8/2010 | Angle et al. | | |
| 7,860,796 B2 * | 12/2010 | Levy | ................................ | 705/45 |
| 7,958,033 B2 * | 6/2011 | Wardley et al. | .................. | 705/35 |
| 8,095,452 B2 * | 1/2012 | Doornebos et al. | ............. | 705/37 |
| 2002/0038270 A1 * | 3/2002 | Shin et al. | ......................... | 705/36 |
| 2002/0087454 A1 | 7/2002 | Calo et al. | | |
| 2002/0111896 A1 * | 8/2002 | Ben-Levy et al. | ............... | 705/37 |
| 2002/0184237 A1 | 12/2002 | McFeely | | |

(Continued)

OTHER PUBLICATIONS

U.S. Appl. No. 12/914,699, filed Oct. 28, 2010; Inventor: Cole et al.

(Continued)

*Primary Examiner* — Gregory Johnson
(74) *Attorney, Agent, or Firm* — Nixon & Vanderhye P.C.

(57) ABSTRACT

Market data is monitored for purposes of canceling orders for financial articles of trade. Real-time data is collected from multiple liquidity destinations trading at least one financial article of trade. The real-time data comprises disparate data corresponding to associated liquidity destinations. The collected real-time data is normalized into a standardized form. A condition is defined of a trading market that includes one or both of submitted and executed transactions of financial articles of trade over the multiple liquidity destinations. The condition is associated with an entity. Through monitoring of the normalized real-time data, an event is identified in the trading market that matches the condition. Upon identification of the condition, at least one communication session between the entity and a corresponding liquidity destination is terminated causing a process at the corresponding liquidity destination to cancel pending or outstanding orders for financial articles of trades from the entity.

30 Claims, 7 Drawing Sheets

U.S. PATENT DOCUMENTS

| | | | | |
|---|---|---|---|---|
| 2003/0009419 | A1 | 1/2003 | Chavez et al. | |
| 2003/0033239 | A1* | 2/2003 | Gilbert et al. | 705/37 |
| 2003/0041000 | A1* | 2/2003 | Zajac et al. | 705/37 |
| 2003/0041006 | A1 | 2/2003 | Bunda | |
| 2003/0055768 | A1 | 3/2003 | Anaya et al. | |
| 2003/0097327 | A1 | 5/2003 | Anaya et al. | |
| 2003/0139990 | A1 | 7/2003 | Greco | |
| 2004/0059666 | A1 | 3/2004 | Waelbroeck et al. | |
| 2004/0139031 | A1* | 7/2004 | Amaitis et al. | 705/80 |
| 2004/0243503 | A1* | 12/2004 | Eng et al. | 705/37 |
| 2004/0260553 | A1 | 12/2004 | Niemi | |
| 2005/0010475 | A1 | 1/2005 | Perkowski et al. | |
| 2005/0044035 | A1 | 2/2005 | Scott | |
| 2005/0154668 | A1 | 7/2005 | Burns | |
| 2005/0171887 | A1* | 8/2005 | Daley et al. | 705/37 |
| 2005/0171891 | A1* | 8/2005 | Daley et al. | 705/37 |
| 2005/0203825 | A1 | 9/2005 | Angle et al. | |
| 2005/0228735 | A1* | 10/2005 | Duquette | 705/37 |
| 2005/0251448 | A1* | 11/2005 | Gropper | 705/14 |
| 2005/0273418 | A1 | 12/2005 | Campbell | |
| 2006/0047590 | A1 | 3/2006 | Anderson et al. | |
| 2006/0265317 | A1* | 11/2006 | Duquette | 705/37 |
| 2006/0271475 | A1* | 11/2006 | Brumfield et al. | 705/39 |
| 2007/0156919 | A1 | 7/2007 | Potti et al. | |
| 2008/0015970 | A1* | 1/2008 | Brookfield et al. | 705/37 |
| 2008/0059846 | A1* | 3/2008 | Rosenthal et al. | 714/100 |
| 2008/0086352 | A1* | 4/2008 | Hibbert et al. | 705/8 |
| 2008/0086401 | A1 | 4/2008 | Mather | |
| 2008/0228617 | A1* | 9/2008 | Johnson | 705/37 |
| 2008/0235146 | A1* | 9/2008 | Hirani et al. | 705/80 |
| 2008/0243675 | A1 | 10/2008 | Parsons | |
| 2008/0281750 | A1 | 11/2008 | Toffey et al. | |
| 2009/0234776 | A1 | 9/2009 | Bauerschmidt et al. | |
| 2009/0319417 | A1* | 12/2009 | Littlewood | 705/37 |
| 2010/0094743 | A1* | 4/2010 | Robertson et al. | 705/37 |
| 2010/0332368 | A1* | 12/2010 | Alderucci et al. | 705/37 |
| 2011/0166982 | A1* | 7/2011 | Cole et al. | 705/37 |
| 2011/0225081 | A1* | 9/2011 | Kittelsen et al. | 705/37 |

OTHER PUBLICATIONS

Notification of Transmittal of International Preliminary Report and Written Opinion for International Application No. PCT/US10/54538 mailed Jan. 4, 2011.

Notification of Transmittal of International Preliminary Report and Written Opinion for International Application No. PCT/US10/47394 mailed Oct. 22, 2010.

U.S. Appl. No. 12/131,921, filed Jun. 2, 2008; Inventor: Kittelsen et al.

U.S. Appl. No. 12/836,943, filed Aug. 31, 2010; Inventor: Angele et al.

U.S. Appl. No. 12/873,148, filed Aug. 31, 2010; Inventor: Cole et al.

Office Action mailed Sep. 9, 2010 in co-pending U.S. Appl. No. 12/836,943.

Office Action mailed Jul. 28, 2010 in co-pending U.S. Appl. No. 12/131,921.

Office Action mailed Nov. 9, 2010 in co-pending U.S. Appl. No. 12/131,921.

International Search Report for PCT/US08/07025, mailed Aug. 20, 2008.

Written Opinion of the International Searching Authority for PCT/US08/07025, mailed Aug. 20, 2008.

Office Action mailed Oct. 15, 2012 in co-pending U.S. Appl. No. 12/873,148.

Office Action mailed Oct. 9, 2012 in co-pending U.S. Appl. No. 12/914,699.

* cited by examiner

METHOD AND SYSTEM FOR CANCELING ORDERS FOR FINANCIAL ARTICLES OF TRADES

PRIORITY APPLICATION

This application claims priority from U.S. provisional patent application 61/300,667, filed on Feb. 2, 2010, the contents of which are incorporated herein by reference.

TECHNICAL FIELD

The technology relates to facilitating the cancellation of orders for financial articles of trade.

BACKGROUND

Trading entities take advantage of prime brokerage service offerings, as well as the capital strength and reserves, of numerous prime brokerage firms by executing transactions with multiple prime brokers. That is, one trading entity may have relationships with more than one prime broker in order to take advantage of efficiencies in reaching the market and other proprietary access or information available to one prime broker over other prime brokers. In a way, this distributed relationship with multiple prime brokers increases the trading entity's opportunity to make trades throughout the market.

In addition, a trading entity may utilize sophisticated algorithmic programs to dictate its trading activity with each of these prime brokers and to the market. Vital to the execution of these algorithmic programs is the time needed to execute those instructions within the market. For instance, as part of the investment strategy, some sophisticated algorithmic programs include instructions to cancel pending trading orders. It is imperative that cancellation of these pending trading orders occurs within the least amount of time. As more time elapses after a decision is made to cancel trading orders, the potential to fill pending trading orders that were slated for cancellation increases, which is opposite to what the trading entity desires within the context of its trading strategy.

However, cancellation of pending orders or transactions of a trading entity can be a burdensome process. In one case, for each pending order a cancellation instruction must be placed with the corresponding liquidity destination that is servicing that order. Taken in isolation, each cancellation order is sent to the corresponding liquidity destination very quickly. While this may not seem critical for a single cancellation order, when the number of cancellation orders dramatically increases, the overall time to send all cancellation orders also will increase. This will adversely effect the time to execute all cancellation orders at corresponding liquidity destinations.

Further, time-to-market is critical in gaining an advantage over competing trading entities. In this context, time-to-market means the time necessary to send all desired cancellation messages for all applicable orders. This is different from the time that it takes to send a single cancellation request since cancellation requests can "queue up" one upon another. That is, even for each order or transaction taken in isolation, trading entities demand lower and lower time-to-market values. As such, even though sending a cancellation order to a corresponding liquidity destination may occur quickly (e.g., within fractions of a second), it is imperative that this time-to-market for the cancellation instruction be lowered even more. As a result, by lowering the time-to-market values, not only will the trading entity see an immediate benefit for each cancellation instruction, but may achieve a compounded benefit as the numbers of cancellation instructions increase.

SUMMARY

One aspect of the technology described in this application relates to a method for cancelling pending orders for financial articles of trade. Data is collected from a plurality of liquidity destinations trading at least one financial article of trade, wherein the data comprises disparate data corresponding to associated liquidity destinations. The collected data us normalized into a standardized form, and a condition of a trading market is defined comprising one or both submitted and executed transactions of financial articles of trade over the plurality of liquidity destinations. The defined condition is associated with an entity, and an event in the trading market matching the condition from the normalized data is identified. Based on the matching, at least one communication session between the entity and a corresponding liquidity destination is terminated, and pending orders from the entity are canceled. The collected data is preferably (but not necessarily) real-time data.

In one non-limiting example, the pending orders from the entity are canceled by initiating a process at the corresponding liquidity destination. Terminating a communication session may comprise physically de-coupling a connection between the entity and the corresponding liquidity destination, where the connection enables the communication session, logically de-coupling the connection, and/or invoking a TCP teardown over at least one communication session. A plurality or all of communication sessions between the entity and the plurality of liquidity destinations may be terminated, e.g., via physical de-coupling. Terminating a communication session may comprise activating a switch configured to operate in a connection between the entity and the corresponding liquidity destination to physically de-couple the connection between the entity and the corresponding liquidity destination. The cancelling may include, for example, forcing a cancel-on-disconnect process at the corresponding liquidity destination.

The condition may be based on transactions of financial articles of trade related to the entity or not related to the entity.

One non-limiting example embodiment includes determining, from the data, canceled orders related to the entity over the plurality of liquidity destinations, determining an open order base of the entity based on the data, comparing the open order base to the canceled orders, and determining that orders for transactions of financial articles of trade are not submitted through the plurality of communication sessions when the canceled orders do not correspond to the open order base.

Another non-limiting example embodiment includes restoring the at least one communication session through a pre-trade gateway to the corresponding liquidity destination.

Another aspect of the technology described in this application relates to a method for cancelling pending financial article of trade orders. Data is collected from a plurality of liquidity destinations trading at least one financial article of trade, wherein the data comprises disparate data corresponding to associated liquidity destinations. The collected data collected is normalized into a standardized form, and a condition of a trading market is defined comprising one or both submitted and executed transactions of financial articles of trade over the plurality of liquidity destinations. The condition defined is associated with an entity, and an event is identified in the trading market matching the condition from the normalized data. At least one switch is configured to operate between the entity and the plurality of liquidity destinations over a plurality of connections between the entity and the plurality of liquidity destinations. The plurality of connections facilitates a plurality of sessions between the entity and the plurality of liquidity destinations. Most or all future trading activity of the entity over the plurality of sessions is stopped by the activating the at least one switch. In one non-limiting example embodiment, the stopping all future trading activity includes invoking a single action to stop all future trading activity of the entity over the plurality of sessions. In another non-limiting example embodiment, the plurality of communication session between the entity and the plurality of liquidity destinations are terminated, and a process is forced at each of the plurality of liquidity destinations to initiate cancelling of pending transactions from the entity.

Another aspect of the technology described in this application relates to a method for cancelling pending financial article of trade orders. Data is collected from a plurality of sources trading at least one financial article of trade with a plurality of liquidity destinations and normalized into a standardized form. A condition of a trading market comprising submitted transactions of financial articles of trade over the plurality of liquidity destinations is defined and associated with an entity. An event in the trading market matching the condition from the normalized data is identified, and based on the matching, at least one communication session between the entity and a corresponding liquidity destination is terminated. An action at the corresponding liquidity destination is triggered that cancels pending transactions from the entity.

Another aspect of the technology described in this application relates to a system configured to cancel pending financial article of trade orders. A communication device is configured to set up a communication session between an entity and a liquidity destination, where the communication session facilitates trading of at least one financial article of trade. A connection is established between the entity and the liquidity destination, and a gateway is associated with the connection. A collector is configured to collect data including transactions of financial articles of trade. An event identifier is configured to identify an event matching a defined condition in a trading market comprising one or both of submitted and executed transactions of financial articles of trade over a plurality of liquidity destinations from the collected data, where the condition is associated with the entity. A controller is configured to terminate the connection using the gateway when the event is identified.

In non-limiting example embodiments, the gateway is a logical switch or a physical switch. The collector may be configured to collect real-time data from the plurality of liquidity destinations, where the real-time data comprises disparate data corresponding to associated liquidity destinations. The collector may also be configured to collect real-time data from a plurality of sources trading the at least one financial article of trade over the plurality of liquidity destinations.

Another aspect of the technology described in this application relates to an apparatus configured to cancel pending orders for financial articles of trade. Electronic circuitry is configured to: establish a communication session between an entity and a liquidity destination, wherein the communication session facilitates trading of at least one financial article of trade and associate the communication session to a connection between the entity and the liquidity destination, where a switch is associated with the connection; collect data including transactions of financial articles of trade; identify an event matching a defined condition in a trading market comprising one or both of submitted and executed transactions of financial articles of trade over a plurality of liquidity destinations from the collected data, wherein the condition is associated with the entity; and cancel multiple pending transactions from the entity as soon as the event is identified. In a non-limiting example embodiment, the electronic circuitry is configured to cancel the multiple pending transactions at each of multiple liquidity destinations using a single command.

BRIEF DESCRIPTION OF THE DRAWINGS

Example non-limiting embodiments are illustrated in referenced figures of the drawings.

DETAILED DESCRIPTION

Figure 1:
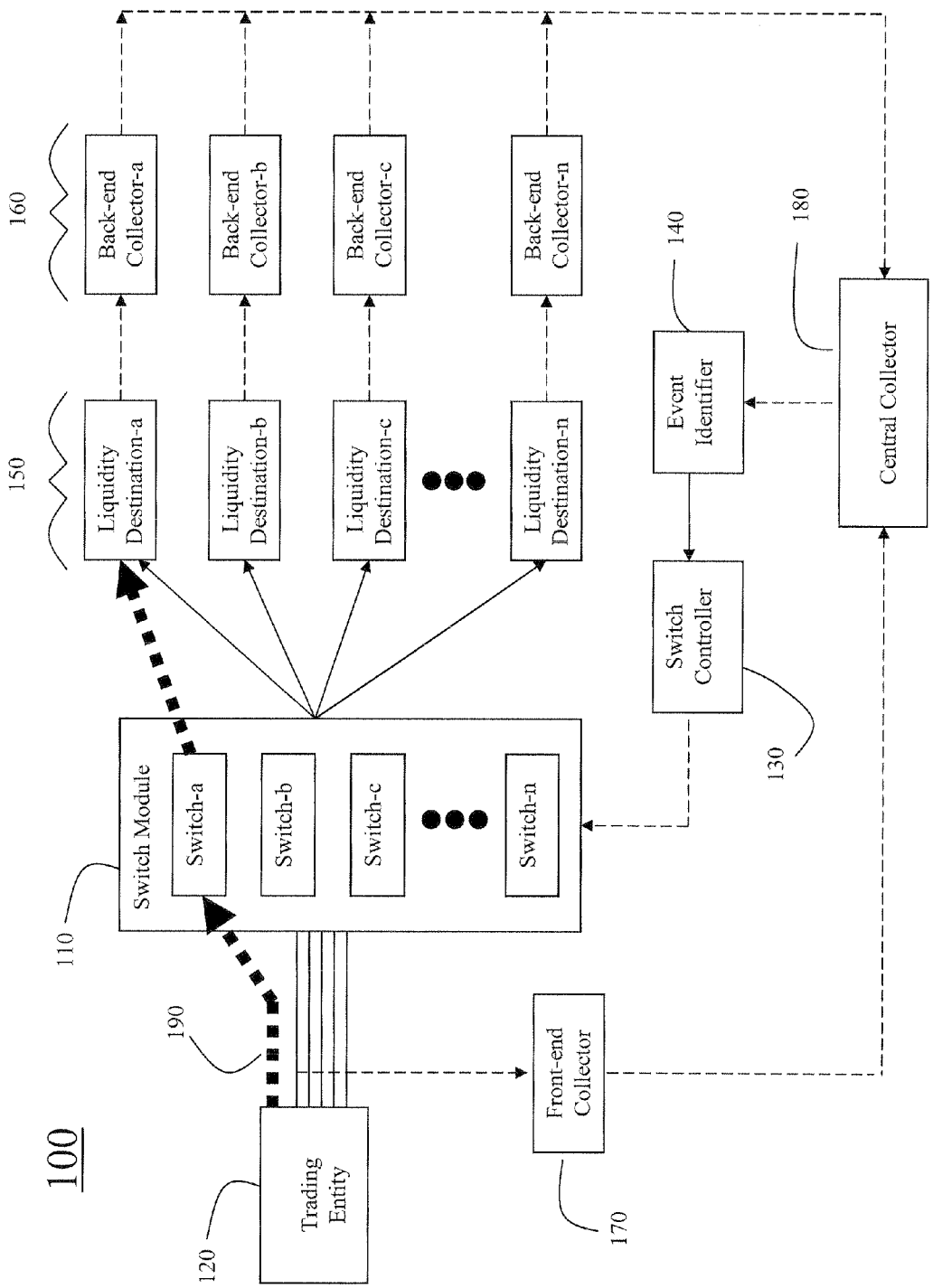
FIG. 1 is an illustration of a system that is capable of quickly executing cancellation instructions on pending orders for financial articles of trade, in accordance with one non-limiting, example embodiment.

Reference will now be made in more detail to non-limiting, example embodiments of systems and methods for distributing cancellation instructions for pending orders of financial articles of trades with one or more liquidity destinations. These embodiments are not intended to limit the claims. On the contrary, the claims cover alternatives, modifications and equivalents.

Accordingly, the technology described in this application provides for the quick and bulk dissemination of one or more cancellation instructions of pending orders of financial articles of trades that are associated with a particular trading entity. In addition, the technology described in this application reduces the time-to-market, e.g. the time for all cancellations of orders to reach all concerned liquidity destinations, when placing a cancellation instruction for a trading entity's pending order of a financial article of trade with a corresponding liquidity destination. Further, the technology described in this application reduces the time-to-market when placing a plurality of cancellation instructions for a particular trading entity's pending orders of financial articles to trade with a plurality of liquidity destinations.

The term "financial articles of trade" within this disclosure is made in reference to securities or security transactions, and more particularly should be interpreted as transactions involving securities, commodities, options or futures over one or more liquidity destinations (e.g., NYSE, NASDAQ, or Alternative Trading Systems, such as electronic communication network (ECNs)). The term "other financial articles of trade" refers to any other article traded at the liquidity destinations other than securities, commodities, options, or futures. Throughout this Application, it is intended that the term "financial articles of trade" and their transaction includes reference to types of transactions involving these "other financial articles of trade." It should be appreciated that different configurations can be used to consolidate and analyze the data to achieve a given result. Although particular combinations are disclosed, variations on those combinations can be used to achieve the desired consolidation and analysis in the financial article of trade data processing system.

Notation and Nomenclature

Non-limiting, example embodiments can be implemented using one or more computer-implemented software programs for processing data through a computer system. The computer system can be one or more personal computers, notebook computers, server computers, mainframes, networked computers (e.g., routers), handheld computers, personal digital assistants, workstations, and the like. Alternatively or in addition, the non-limiting, example embodiments may be implemented through specialized hardware that is activated by a signal generated by the process that normalizes and evaluates the real-time trading activity of the trading entity. The computer-controlled program and/or a hardware implementation is operable for enabling the distribution of cancellation instructions for pending orders of financial articles of trade with one or more liquidity destinations. In one non-limiting, example embodiment, the computer system includes one or more processors coupled to a bus and memory storage coupled to the bus. The memory storage can be on-chip and/or off-chip, volatile or non-volatile, and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that terms such as "defining," "collecting," "normalizing," "identifying," "terminating," or the like refer to the actions and processes of a computer system including an embedded system, or similar electronic computing device, or other suitable electronic circuitry, that manipulates and transfers data represented as physical (electronic) quantities within the computer system's registers and memories into other data similarly represented as physical quantities within the computer system memories or registers or other such information storage, transmission or display devices.

System and Method for Cancelling Pending Orders of Financial Articles of Trade

FIG. 1 is an illustration of a data processing system 100 that is capable of monitoring market transaction activity data from a plurality of liquidity destinations 150 and quickly executing cancellation instructions on pending orders for financial articles of trade with one or more liquidity destinations, in accordance with one non-limiting, example embodiment. The financial article of trade data processing system includes various functions, which may be implemented to perform consolidation and analysis of intraday issues related to submitted securities, commodities, options, futures transactions, and other financial articles of trade transactions.

As shown in FIG. 1, a trading entity 120 is associated with financial articles of trade being processed and executed through the market, e.g., including all liquidity destinations. The term "trading entity" is meant to include various types of entities. For example, a trading entity 120 may be any partner that is involved in trading a financial article of trade. As such, the trading entity 120 may be an individual associated with a market participant identifier (MPID), broker, prime broker, clearing house, etc. In one particular example implementation, the trading entity 120 is associated with a computer-implemented algorithmic program that acts on behalf of the trading entity 120 in placing various instructions involving the execution of financial articles of trade within the trading market. In addition, the term "prime broker" includes any entity that facilitates the trading activity of a particular trading entity 120 such as a broker, bank, brokerage house, clearing house, etc.

In particular, the trading entity 120 has relationships with one or more prime brokers who facilitate execution of trading financial articles of trade on one or more liquidity destinations for that trading entity 120. Though not shown, the trading entity 120 may be acting through one or more prime brokers for facilitating access to one or more liquidity destinations a-n that make up the plurality of liquidity destinations 150. Also, the trading entity 120 may be directly accessing one or more liquidity destinations a-n through sponsorship by a particular prime broker (e.g., sponsored access). As a result, the trading entity 120 has access to one or more liquidity destinations a-n, either through a representative prime broker, or on behalf of a representative prime broker, such as through sponsored or naked access. Sponsored Access refers to the granting of access to a Liquidity Destination for a Trading Entity by a sponsoring member of the Liquidity Destination using the membership identifier of the sponsoring member of the Liquidity Destination. Naked Access refers to a particular type of Sponsored Access arrangement where the sponsoring member of the Liquidity Destination provides the Trading Entity with access to the Liquidity Destination using the sponsoring member's member identifier without any risk management or surveillance oversight by the member of the Liquidity Destination over the trading activity of the Trading Entity on the Liquidity Destination.

In particular, the trading entity 120 establishes one or more communication sessions with one or more liquidity destinations a-n so that the trading entity 120 can place orders for the purchase, sale, and/or other type of transactions of securities, commodities, and other financial articles of trade. Each communication session is established between the trading entity 120, or a representative of the trading entity 120, with a corresponding liquidity destination. The communication session facilitates interaction between the trading entity 120, or its representative, and the corresponding liquidity destination (e.g., liquidity destination a). In general, a communication session may be defined as a logical connection between two parties and includes a sequence of communication messages (e.g., requests and responses) between the two parties participating in the communication session. The communication session may exist for prolonged periods of time, and last until the session is dismantled. Any suitable protocols may be used to establish and manage the communication session between the two parties (e.g., Transmission Control Protocol/Internet Protocol, etc.).

In addition, the communication session occurs over a preferably dedicated (though not necessarily dedicated) path or channel through a communication network of various network devices (e.g., routers and switches), in one non-limiting, example embodiment. The dedicated path or channel communicatively connects and/or couples the two parties at either end. The path or channel may be viewed as a logical or physical path or channel between the two parties. More particularly, each message of the communication session is delivered through the network using the same devices that defines the dedicated path through the network. This dedicated path may actually manifest itself as more than one physical path to allow for automatic failover.

For instance, as shown in FIG. 1, the trading entity 120 has established one or more communication sessions with one or more liquidity destinations a-n to facilitate trading of one or more financial articles of trade. As an illustration, the trading entity 120 may access the market using one or more prime brokers, which in turn access one or more liquidity destinations a-n. In addition, the trading entity 120 may directly access the market through corresponding liquidity destinations.

More particularly, for each communication session, the trading entity 120 establishes a connection with a corresponding liquidity destination. As a representative example, as shown by the dotted and bolded line, a connection 190 is made between the trading entity 120 and liquidity destination-a to facilitate a corresponding communication session between the parties. It is important to note that the trading entity 120 may establish and have one or more communication sessions over one or more connections with a particular liquidity destination, such as liquidity destination-a. This is especially true when the trading entity 120 deals with a large volume of financial articles of trade with that particular liquidity destination.

The connection between the trading entity 120 and the liquidity destination-a establishes the network path for a communication session between the two parties, and may be viewed as a physical or logical connection. More particularly, the connection between the trading entity 120 and the liquidity destination-a establishes dedicated network devices that are used over the network path. These same devices are used throughout the communication session, in one non-limiting, example embodiment.

In one non-limiting, example embodiment, the connection 190 between the trading entity 120 and the liquidity destination includes a switch module/device 110 or the like that can cut/sever a connection. For instance, in the above example, the connection 190 establishing the communication path between the trading entity 120 and liquidity destination-a, as shown by the dotted and bold line, includes switch-a, a component of module 110. More specifically, each switch component acts as a gateway to a corresponding liquidity destination. For instance, the switch component-a could be a logical switch or a physical switch (such as a network switch or a mechanical device to sever a physical link). As a gateway, the switch module/device 110 adds little or no latency to time-to-market values, in that the switch module/device 110 merely passes through any messages delivered in the corresponding communication session.

The location of the switch module/device 110 in FIG. 1 is provided for illustration. It is contemplated that the switch module/device 110 may be situated in various locations of the corresponding network path between the trading entity and the liquidity destination. For instance, the switch module/device 110 may be jointly located at a liquidity destination, a trading entity 120, or a representative of the trading entity 120, or may be remotely located from the liquidity destination, trading entity 120, or the representative of the trading entity 120. Additionally, the switch components a-n are shown in FIG. 1 within switch module/device 110 as a representative example. As explained above, it is contemplated that the switch components may be situated at any location within a network path between the trading entity 120 and a corresponding liquidity destination. As such, the switch module/device module 110 may be a logical or physical representation of the various switch components a-n that may be situated at any point within the various network paths between the trading entity 120 and a corresponding liquidity destination. In any of the locations, the switch module/device 110 or switch components of switch module/device 110 remain within the preferably though not necessarily dedicated path between the trading entity 120 and the corresponding liquidity destination, even if different network devices are used to account for automatic failover.

As shown in FIG. 1, the overall switch module/device 110 may comprise one or more underlying switch components a-n, wherein each underlying switch component services one or more communication sessions with one or more liquidity destinations. In one non-limiting, example embodiment, one switch component may service one communication session between the trading entity 120 and a single liquidity destination. In another non-limiting, example embodiment, the switch component may service more than one communication session established between the trading entity 120 and a single liquidity destination. In still another non-limiting, example embodiment, the switch component may service more than one communication session established between the trading entity 120 and multiple liquidity destinations.

In addition, each switch component a-n is capable of terminating one or more communication sessions over one or more network paths or connections, each of which includes that switch component. The instruction to terminate a communication session is provided by the switch controller 130, which controls the functions of one or more corresponding switch components a-n. One or more switch controllers may be used cooperatively to control switch components a-n. Termination of a communication session is achieved logically or physically through implementation of the switch component. In the logical case, the switch logically severs the connection between the trading entity 120 and the corresponding liquidity destination. In the physical case, the switch physically severs the connection between the trading entity 120 and the corresponding liquidity destination. In either case, termination begins a TCP Teardown process for both parties, when the protocol being used to establish and maintain the corresponding communication session is TCP/IP.

By terminating a communication session between the parties, the corresponding liquidity destination is forced, e.g., by previously set procedures of the liquidity destination in case of lost connection, to initiate a process that cancels pending orders of financial articles of trade delivered over the communication session. For example, the trading entity 120 has delivered orders (e.g., buy and sell orders) for financial articles of trade to liquidity destination-a over the communication session. Some of those orders may have been filled by that liquidity destination-a, while other orders remain pending or unfilled by liquidity destination-a, and are also sometimes known as resting orders. For those pending orders, the corresponding liquidity destination begins an internal process to cancel any pending orders that are remaining when the corresponding liquidity destination-a detects the termination of the communications session.

In another non-limiting, example embodiment, one or more of the plurality of liquidity destinations 150 offer a separate interface to request the clearing of the order flow. As such, the switch controller 130 interacts with the corresponding liquidity destination through this separate interface to send a command to the liquidity destination to terminate the trading flow over the corresponding communication session. Termination of communication sessions forces the liquidity destination to perform a cancel process, e.g., a cancellation process already established at the liquidity destination, for pending orders relating to the corresponding trading entity. Liquidity destinations typically have in place a process generally referred to as "Cancel Upon Disconnect" for protecting against unintended disconnects of a connection in which event all open orders for the impacted trading entity are automatically cancelled upon termination of the connection. This non-limiting, example embodiment takes advantage of this process to terminate a connection (whether physically or logically) when an event arises where further trading by a trading entity is no longer desired. In other words, if an event arises where the trading behavior justifies termination of outstanding orders, a disconnect is accomplished by purposefully activating the "Cancel Upon Disconnect" operation at the appropriate liquidity destinations.

Thus, in non-limiting, example embodiments, the "Cancel Upon Disconnect" process already existing for another purpose is exploited and invoked by the technology described here to as part of a risk management strategy as well as an investment strategy. For instance, with regards to risk management, the process for cancelling pending orders of transactions of financial articles of trade is initiated and executed when it is determined that the trading entity 120 is not complying with risk management parameters. In addition, the process for cancelling pending orders is initiated and executed when the automated trading strategy, as implemented through a trading algorithm implemented by a computer, has failed (e.g., equipment failure) or is not functioning properly. Also, with regards to implementation of an investment strategy, instead of a protective measure to hold the position of a trading entity 120 when service networks fail, non-limiting, example embodiments actively invoke the cancellation process at each liquidity destination as part of a pro-active investment strategy for a trading entity 120, wherein the investment strategy may include the risk management strategy discussed above. As such, a single command, or a small number of commands, to terminate multiple or all communication sessions supporting the activity of a trading entity 120 will initiate the internal process (e.g., Cancel on Disconnect) to cancel pending orders of transactions of financial articles of trade at each corresponding liquidity destination.

Those skilled in the art will appreciate, however, that the technology is not limited to the "Cancel Upon Disconnect" process. Indeed, other similar cancellation processes may be used.

Using the switch module 110 to terminate communication sessions utilized by the trading entity 120 enhances the capability of the trading entity 120 to control its actions. Specifically, rather than sending out a high number of cancellation messages (e.g., millions of cancellations) to a plurality of liquidity destinations, wherein each cancellation message is targeted to a specific order of a financial article of trade, this non-limiting, example embodiment is capable of sending out a single instruction or a minimum number of instructions to terminate communication sessions related to or used by that trading entity 120 that effectively initiates a cancellation process for pending orders for financial articles of trade held by that trading entity 120. As such, each cancel instruction effectively cancels one or more pending orders at a corresponding liquidity destination.

The decision to terminate a communication session for a trading entity 120 may also be made by the data processing system 100 of FIG. 1. The decision is based on market activity of all liquidity destinations (both generally market data as well as data specific to the trading group or entity being monitored) that is monitored by the data processing system. In particular, as shown in FIG. 1, a central collector 180 collects real-time data to include transactions of financial articles of trade. In one non-limiting, example embodiment, a plurality of back-end collectors 160 collects transaction information directly from each liquidity destination throughout a trading period, and in real-time. The plurality of back-end collectors 160 includes one or more back-end collectors a-n. Although back-end collectors a-n are shown in FIG. 1 in a one-to-one relationship with a corresponding liquidity destination, a back-end collector may collect information from more than one liquidity destination, or the central collector 180 may provide some or all of the collection capabilities for the data processing system 100.

More specifically, information collected includes transactions that are submitted to a corresponding liquidity destination as well as transactions that have been executed by the corresponding liquidity destination. In this manner, by collecting information directly from each liquidity destination, a picture of the market may be generated that can broadly cover the entire market, or that can be narrowed to give a picture involving some or all of the transactions related to or originating from a trading entity. In a sense, the information collected relating to submitted transactions provides an at-trade viewpoint of the market, i.e., a viewpoint taken instantly at the moment of trade. Also, information collected relating to executed trade article transactions provides a post-trade viewpoint of the market. This at-trade and post-trade market transaction activity information is submitted to the central collector for further processing. In another non-limiting, example embodiment, there can be a collector that receives information directly from a front-end system of the trading entity 120 used for submission and collection of trading information rather than the exchange itself to allow more transaction detail to flow into the data collector 180 since what is visible from the exchange data is potentially not as detailed as what the underlying trading system knows about each trade (e.g. account, subaccount, etc). This is more fully described below in relation to the front-end collector 170.

Collection of information from each of the liquidity destinations, as transactions are submitted, ensures the integrity and objectivity of the data. In non-limiting, example embodiments, if there is a central collector 180 that does receive data from the trading system of the trading entity 120 to get greater granularity of information, the central data collector 180 can still receive feeds directly from the exchanges as well, from corresponding back-end collectors, wherein the central data collector 180 is capable of verifying that there are messages coming in from both sources that match at the transactional level. As such, the information collected by the central collector 180 can be viewed as a baseline of information from which other information can be compared, as will be described more fully below. For instance, the information collected may be used to improve a trading entity's 120 compliance with regulatory requirements.

In another non-limiting, example embodiment, as previously described, information is collected from the trading entity 120 and/or related sources (e.g., prime brokers, etc.) utilized by that trading entity 120 to facilitate trading at least one financial article of trade over the plurality of liquidity destinations 150. For instance, a front-end collector 170 collects transaction information over the communication sessions before they are submitted to the plurality of liquidity destinations 150. In a sense, the information collected provides a pre-trade viewpoint of the market. This pre-trade market transaction activity information is submitted to the central collector 180 for further processing.

As shown in FIG. 1, the central collector 180 collects and aggregates information from the various liquidity destinations 150 and/or directly from the trading entity 120. In addition, the information collected and aggregated may be normalized so that further processing of the market transaction activity data is possible. For instance, the central collector 180 receives disparate data from the plurality of liquidity destinations, where the disparate data includes information in varying formats. In another instance, the central collector 180 receives raw market transaction activity data in real-time from each of the liquidity destinations a-n that is trading at least one financial article of trade, normalizes the information, and provides further processing of the market transaction activity data. In some non-limiting, example embodiments, each of the plurality of back-end collectors, e.g., servers, 160 is capable of normalizing and processing the information collected at corresponding liquidity destinations. Thereafter, the processed information is then submitted to the central collector 180. As such, the central collector 180 is capable of receiving the data from each of the liquidity destinations a-n and/or the trading entity 120, whether the data is raw or already processed.

The financial article of trade data processing system 100 of FIG. 1 is capable of identifying particular conditions within the market that are of interest to the trading entity 120. For instance, a condition of a trading market may be defined by user parameters. As a result, an event identifier 140 monitors and processes the real-time market data that is collected and normalized to help identify an event that matches the condition, as defined by parameters provided by the trading entity 120. By its association with the condition, whenever the event is identified, the event identifier 140 notifies the switch controller 130 of its occurrence, upon which the controller 130 sends out the instruction to terminate communication sessions that are associated with and/or utilized by the trading entity 120.

In some non-limiting, example embodiments, the condition is related to transactions originating from, involving, or generally being associated with the trading entity 120. That is, market activity information is processed and consolidated to provide a view of the market activity for that trading entity 120. As such, conditions relating to risks, trends, outages, uses, etc. that are important to and reflective of that trading entity's 120 position within the market may be identified and immediately addressed through a cancellation process.

In other non-limiting, example embodiments, the condition includes but is not limited to transactions originating from, involving, or generally being associated with the trading entity 120. In still other non-limiting, example embodiments, the condition does not specifically include transactions originating from, involving, or generally being associated with the trading entity 120. That is, there are market conditions that do not directly relate to the transactions associated with a specific trading entity 120, but which the trading entity 120 still tracks and monitors for purposes of initiating a cancellation process. For instance, the system 100 supporting one or more trading entities may have a cap on the total number of orders for transactions of financial articles of trade in a period. The cap is the condition. Once that cap has been met or exceeded by the trading entities as a group, an event matching the condition has occurred, and the process for initiating cancellation of pending orders is started by terminating the communication sessions associated with those trading entities. As such, even though a particular trading entity is entirely in compliance with its rules, a rule outside of the control of that trading entity may be exceeded, thus limiting the trading capability of that trading entity.

Figure 1B:
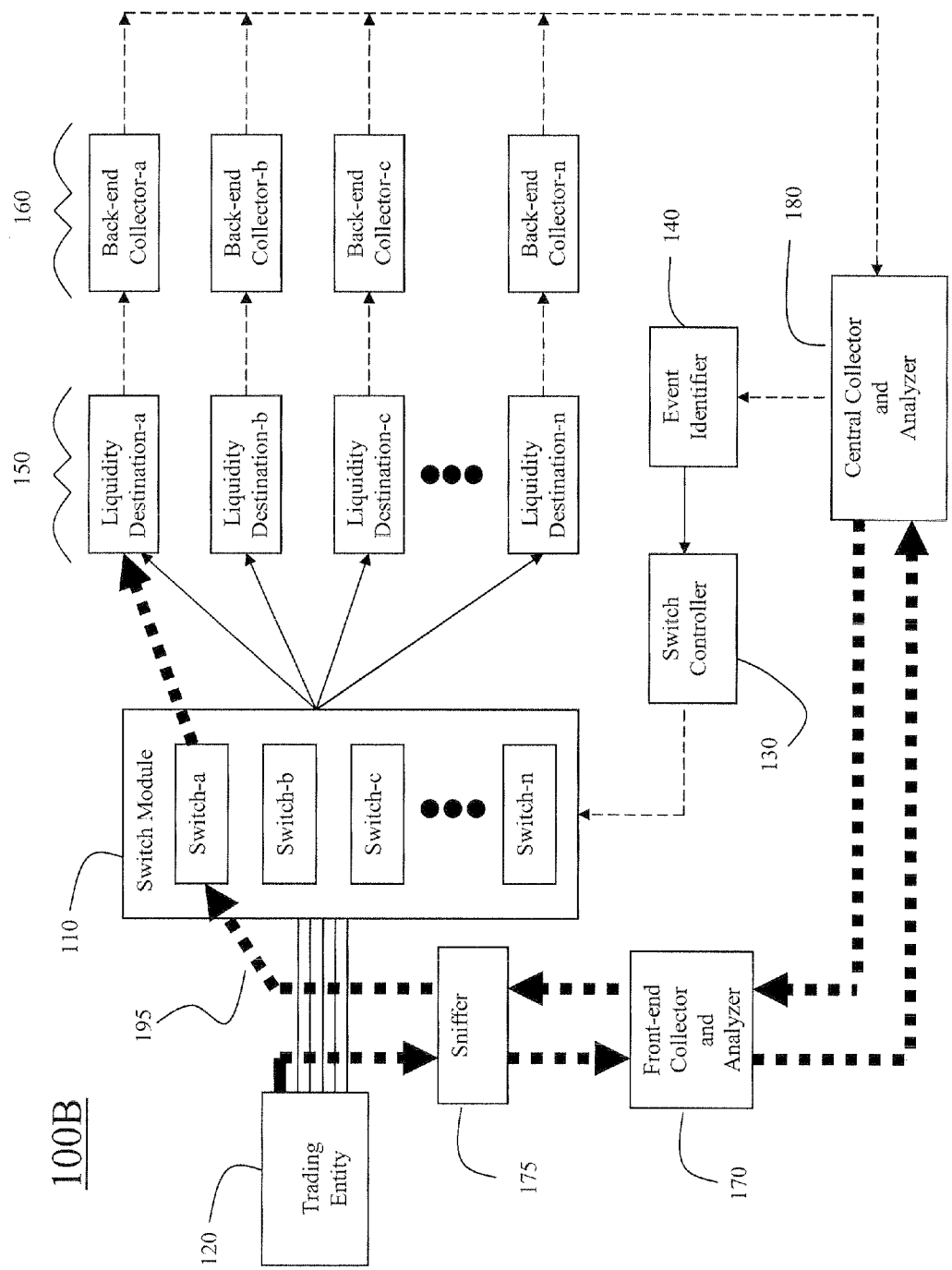
FIG. 1B is an illustration of a system that includes a sniffer that provides real-time sniffing, and is capable of quickly executing cancellation instruction on pending orders for financial articles of trade, in accordance with one non-limiting, example embodiment.

FIG. 1B is an illustration of a system 100B that includes a sniffer 175 that provides real-time sniffing, and is capable of quickly executing cancellation instruction on pending orders for financial articles of trade, in accordance with another non-limiting, example embodiment. The system 100B provides similar features as the system 100 of FIG. 1A, and additional features, such as sniffer 175.

As shown in FIG. 1B, the connection 195 establishing a communication path between the trading entity 120 and the liquidity destination includes switch component-a, as shown by the dotted and bold line. More specifically, switch component-a acts as a gateway to a corresponding liquidity destination, as previously described. For instance, the switch component-a could be a switch, such as a logical switch, or a physical switch (such as a network switch or a mechanical device to sever a physical link). As a gateway, the switch component-a adds little or no latency to time-to-market values, in that the switch component-a merely passes through any messages delivered in the corresponding communication session.

Connection 195 also includes sniffer 175 that is capable of providing real-time sniffing of the traffic flow, comprising communication data packets sent in a communication session supported by connection 195. Sniffer 175 is capable of capturing and/or viewing all communication data packets that pass over connection 195 between trading entity 120 and liquidity destination 150. The captured communication data packets may be stored locally in association with sniffer 175, and/or perform storing processing analyzing functions. In addition, the communication data packets sniffed by sniffer 175 are passed along to other devices that perform storing, processing, and analyzing functions.

The connection 195 and included devices are preferably scalable to support one or more trading entities having one or more connections with one or more liquidity destinations, in various configurations.

In one non-limiting, example embodiment, sniffer 175 captures communication data packets sent along connection 195 and stores the communication data packets without introducing latency in the communication path. That is, sniffer 175 does not interrupt the traffic flow of communication data packets between trading entity 120 and liquidity destination-a. Additional processing may be performed on the captured communication data packets by additional back-end devices in parallel to the delivery of the packets to liquidity destination-a.

In another non-limiting, example embodiment, sniffer 175 captures communication data packets sent along connection 195, and forwards the data to back-end devices for further processing and storing. For instance, the captured communication data packets are sent to front-end collector 170. Additionally, front-end collector 170 may provide local analysis of the data. As an example, front-end collector 170 may perform pre-trade risk analysis to determine if any trade delivered on connection 195 meets established criteria and/or does not violate any identified pre-trade risks. In addition, a live order book may be created asynchronous to the flow of data delivered on connection 195. Trades are analyzed locally to determine whether they should continue to be delivered to the liquidity destination-a, or whether they should be terminated for violation of any identified pre-trade risks. As such, if there is a violation, front-end collector 170 is able to, locally, terminate the delivery of the trade. If there is no violation, the communication data packets may at this point be delivered to switch component-a, either directly or through sniffer 175, for continued delivery to liquidity destination-a. In another implementation, before the communication data packets are delivered to liquidity destination-a, additional processing is performed by back-end devices, as will be described below.

In another non-limiting, example embodiment, sniffer 175 captures communication data packets sent along connection 195, and forwards the data to back-end devices for further processing and storing. That is, the communication data packets are sent to central collector 180 for further processing. Because central collector 180 is capable of collecting pre-trade information from additional trading entities, and back-end collectors servicing one or more liquidity destinations, a more enhanced view of the market is available. As such, the central collector 180 is able to perform more complex pre-trade risk analysis on trades being delivered over connection 195 between trading entity 120 and liquidity destination-a. In addition, a more complete live-order book may be created by the central collector 180 that includes pre-trade information for orders from one or more trading entities, as well as the information obtained from the one or more back-end collectors servicing one or more liquidity destinations previously described. Additional processes may also be performed by the central collector 180.

Thus, front-end collector 170 is able to remotely terminate the delivery of the trade over connection 195 if there is a violation of identified pre-trade risks. If there is no violation, the communication data packets may at this point be delivered to switch component-a, either directly or through one or both front-end collector 170 and sniffer 175, for continued delivery to liquidity destination-a.

Figure 2:
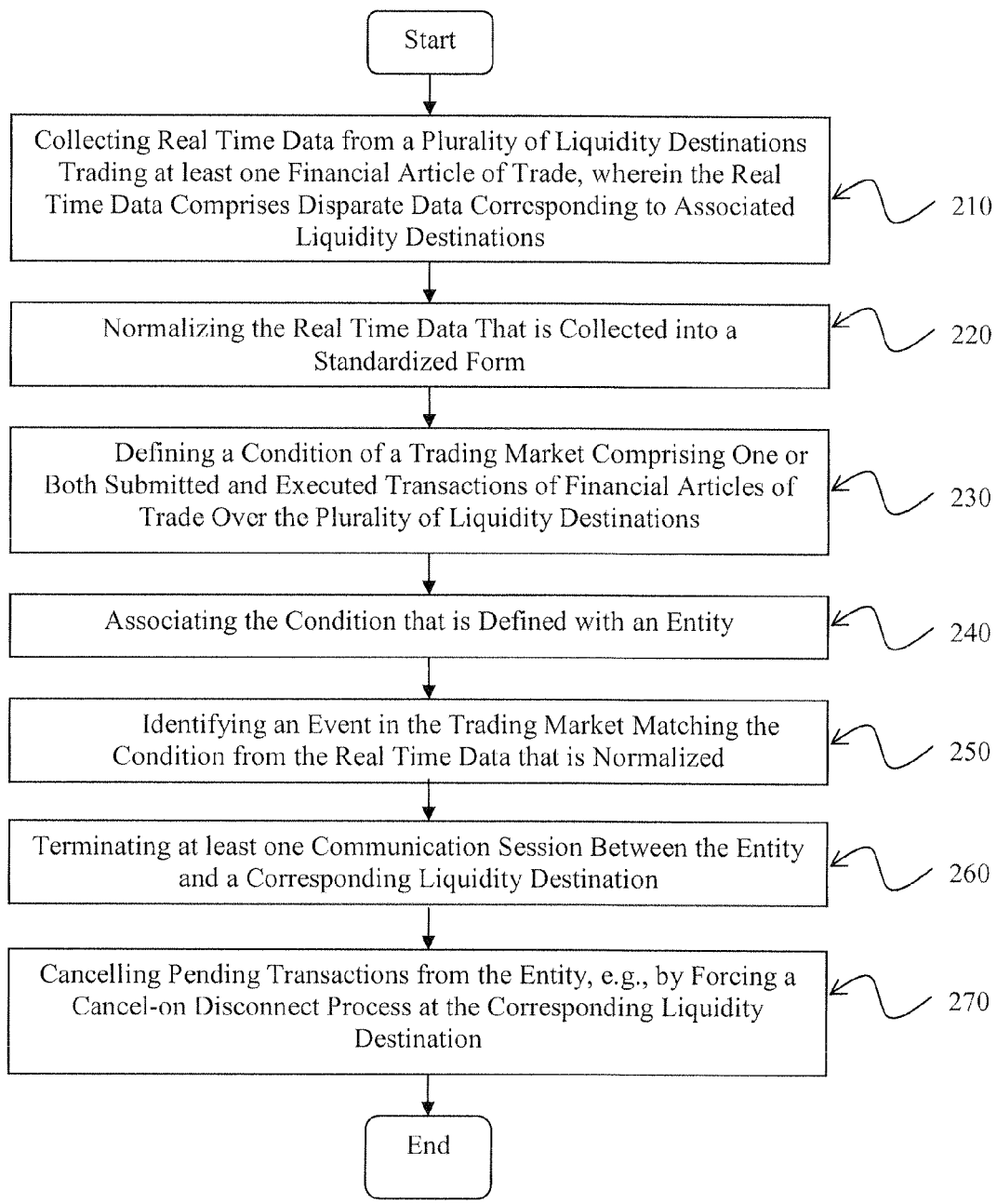
FIG. 2 is a flow diagram illustrating a method for distributing cancellation instructions for pending orders for financial articles of trade to one or more liquidity destinations, in accordance with one non-limiting, example embodiment.

FIG. 2 is a flow diagram 200 illustrating a method for cancelling orders by monitoring market data including initiating and distributing cancellation instructions for pending orders for financial articles of trade to one or more liquidity destinations, in accordance with one non-limiting, example embodiment. The system 100 described in FIG. 1 is suited for implementing the method of FIG. 2, in one non-limiting, example embodiment. That is, the method for initiating and distributing one or more cancellation instructions is suited to cancelling pending orders for transactions of financial articles of trade originating from, being associated with, or involving a trading entity.

As shown in FIG. 2, at 210, real-time data is collected from a plurality of liquidity destinations trading at least one financial article of trade. As previously described, the real-time data may include submitted and/or executed transactions of financial articles of trade that are collected directly from each liquidity destination. In addition, the real-time data may be collected directly from the trading entity or from sources utilized by the trading entity to facilitate execution of transactions of financial articles of trade.

At 220, the real-time data that is collected is normalized into a standardized form. The various liquidity destinations present information in disparate formats, in that each liquidity destination uses its own protocol/format to process transactions of financial articles of trade, and as such, orders for transactions are submitted using that protocol/format. Normalizing the information into a standardized form facilitates additional processing and analysis of the information, instead of separately processing information in their native formatting.

In one non-limiting, example embodiment, this normalization process also includes symbology. That is, one or more symbols used by the various exchanges that are related to a particular trading activity (e.g., options) associated with a company, for example, is normalized to one symbol.

At 230, a condition of the trading market is defined, and at 240, the defined condition is associated with a trading entity. The information defining the trading market may include one or both of submitted and executed transactions of financial articles of trade over the plurality of liquidity destinations. That is, the information may describe the trading market in various states, such as an at-trade state when analyzing submitted transactions, or a post-trade state when analyzing executed transactions, or a combination of the at-trade and post-trade states to give a broader, overall picture of the trading market.

At 250, an event in the trading market is identified as matching the condition. Specifically, the real-time data that this normalized is analyzed to determine when parameters defining the condition occur, such that an event has occurred that matches the condition. As previously described, the condition may include, in part, or as a whole, transactions of financial articles of trade originating from, involving, or relating to the trading entity. For instance, the condition may describe certain risk levels for a particular segment of the market that may or may not include transactions originating from that trading entity.

Once the event is identified, one or more actions may be taken. For instance, in relation to FIG. 1, once the event identifier 140 recognizes the condition signifying an event, a signal indicating an instruction may be generated by the event identifier 140 and delivered to a receiving entity to take action. For instance, the event identifier 140 sends a signal to the switch controller 130 to take a particular action. In one non-limiting, example embodiment, the action taken is to terminate corresponding communication sessions associated with the trading entity 120. This is more fully described below in relation to operation 260.

At 260, at least one communication session between the entity and the corresponding liquidity destination is terminated in response to the occurrence of the event. That is, once the event is identified, one or more communication sessions is terminated. Termination involves determining the trading entity that is associated with the condition, and determining which communication sessions are utilized by that trading entity. As previously described, a communication session facilitates delivery of orders of transactions of financial articles of trade originating from the trading entity to a liquidity destination. In one non-limiting, example embodiment, all communication sessions between the trading entity and the plurality of liquidity destinations are terminated.

Termination may be achieved logically or physically by a switching element as previously described. A logical termination of the communication session may be performed that acts to break-down the communication session. In another case, a physical termination of the communication session may be performed to break-down the communication session, which involves shutting down or breaking part of the connection servicing the trading entity and the corresponding liquidity destination. For instance, the connection may be physically or logically de-coupled, disconnected, broken-down, etc.

In one non-limiting, example embodiment, termination of a communication session is achieved by inserting a switching element in the connection servicing the communication session. The switching element is located on the network path between the trading entity and the corresponding liquidity destination. As previously described, the switching element may include a logical switching element that logically disconnects the connection, or a physical switching element that physically disconnects the connection. Once it is determined that the communication session must be terminated, the switching element is activated such that the connection is logically or physically de-coupled.

At 270, a cancellation process is initiated at the corresponding liquidity destination, e.g., by virtue of terminating the communication session, a cancel-upon-disconnect process already in place at the liquidity destination is forced or triggered. Namely, when a trading entity application disconnection is detected by the exchange system, an en masse cancel-on-disconnect service automatically begins, and the exchange system sends a message to the trading engine to request the cancellation of all live orders entered on the current business day by the customer application, e.g., trading entity application. This is performed regardless of whether there are orders currently live on the trading engine unit or not. If there are orders currently live, a message (e.g., Order Killed) is returned for each order eliminated to the concerned trading entity. The initiated process cancels pending transactions originating from the trading entity over the communication session at the corresponding liquidity destination. As such, the present non-limiting, example embodiment actively invokes a cancellation process at the liquidity destination for pending orders of transactions of financial articles of trade. In this manner, through a single action, the trading entity through implementation of the present non-limiting, example embodiment is able to cancel pending orders of transactions of financial articles of trade, instead of sending individual cancellation instructions for each order.

Figure 3:
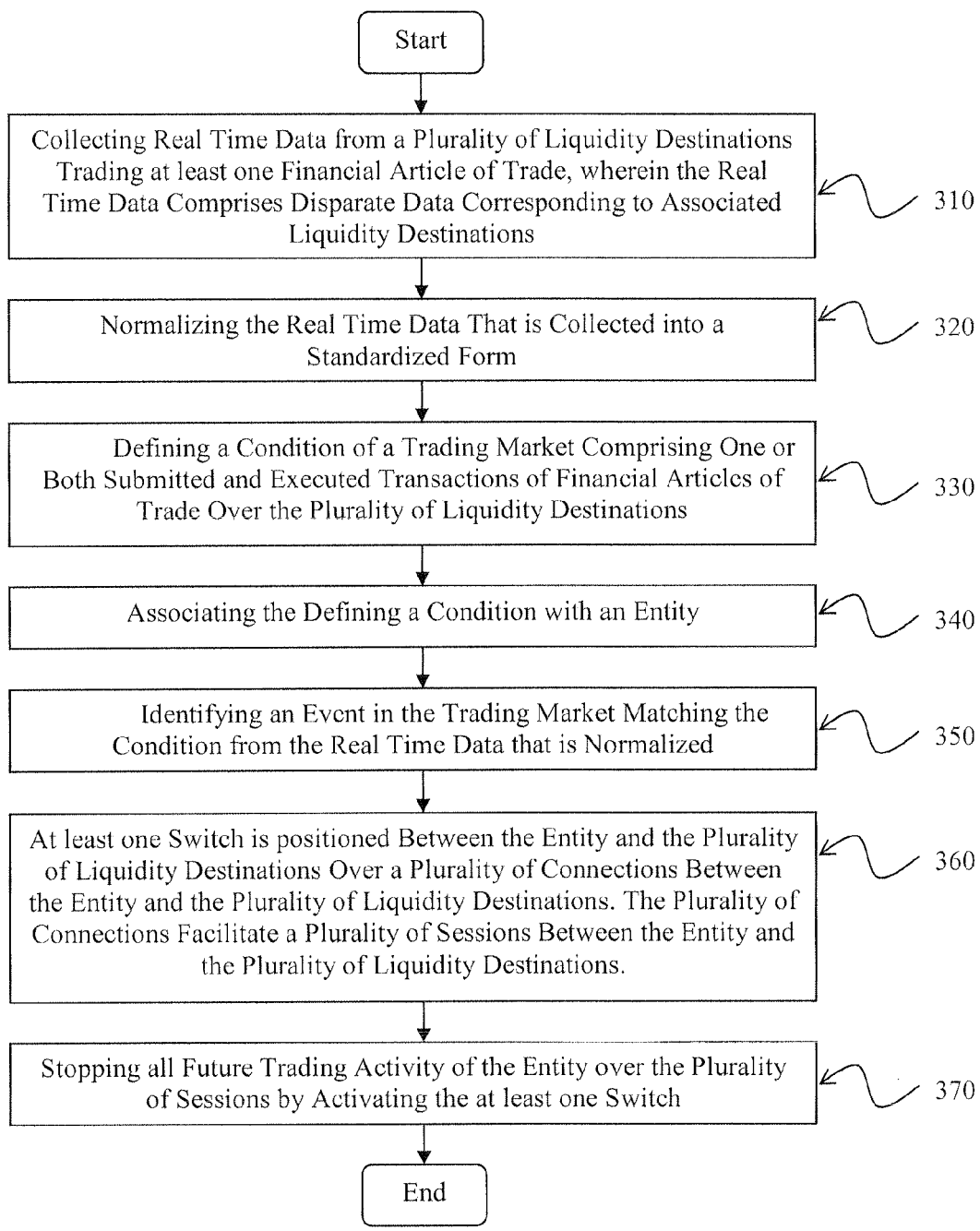
FIG. 3 is a flow diagram illustrating another method for distributing cancellation instructions for pending orders for financial articles of trade to one or more liquidity destinations, in accordance with one non-limiting, example embodiment.

FIG. 3 is a flow diagram 300 illustrating another method for distributing cancellation instructions for pending orders for financial articles of trade to one or more liquidity destinations, in accordance with one non-limiting, example embodiment. More specifically, the method outlined in FIG. 3 provides for disabling future trading activity of a trading entity.

The operations outlined in 310, 320, 330, 340 and 350 are analogous to 210, 220, 230, 240, and 250 of FIG. 2, and the discussions involving those operations of FIG. 2 are equally applicable to the above operations of FIG. 3. In summary, at 310, real-time data is collected from a plurality of liquidity destinations trading at least one financial article of trade, wherein the data includes disparate data corresponding to associated liquidity destinations. At 320, the real-time data is normalized into a standardized form. At 330, a condition of a trading market is defined, where the condition may include one or both submitted and executed transactions of financial articles of trade. At 340, the defined condition is associated with a trading entity. At 350, an event in the trading market that matches the condition is identified.

At 360, at least one gateway or switch which is pre-inserted between the entity and the plurality of liquidity destinations can be activated/signaled to sever the one or more communication sessions. More specifically, the gateway which is pre-inserted in a plurality of connections between the entity and the plurality of liquidity destinations can be activated to sever the one or more communication sessions. In one implementation, a corresponding gateway is included for each connection between the trading entity and a corresponding liquidity destination. As previously described, each connection or channel facilitates a corresponding communication session between the trading entity and a corresponding liquidity destination.

In a trading or risk management strategy implemented by the trading entity, the occurrence of the event indicates that most or all trading by the trading entity must cease. That includes orders that are currently being placed by the trading entity. To facilitate ceasing of future and present trading activity, the gateway or switch is activated, effectively terminating all communication sessions between the trading entity and the plurality of liquidity destinations. As a result, since the gateway is located on a connection between the trading entity and a corresponding liquidity destination, present orders that have been placed and sent by the trading entity, but not yet delivered to the liquidity destination (e.g. pending orders), are intercepted and effectively canceled since the connection servicing the communication session has been severed, and the communication session terminated.

Additionally, all future orders still being placed by the trading entity over the communication session also will be stopped from delivery. Even though the communication session is effectively terminated, the trading entity may not be aware of the termination, and may still be sending orders for transactions of financial articles of trade. Also, even though the trading entity may be aware of the termination of the communication session, it may still send orders for transactions of financial articles of trade in anticipation that the communication session may be restored. Accommodation may be made to permanently cancel all of these pending orders, even if the communication session is restored, in one non-limiting, example embodiment.

Figure 4:
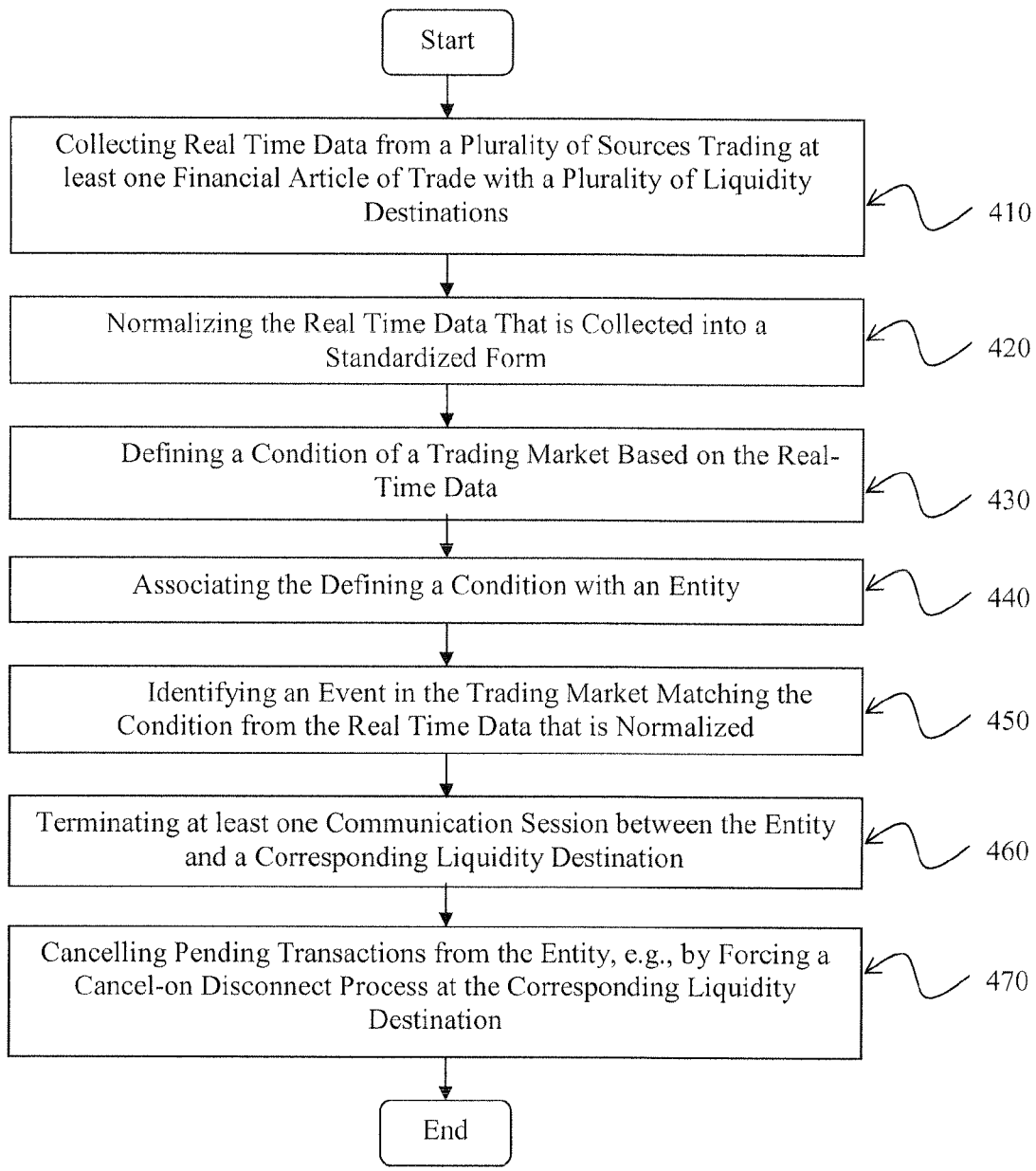
FIG. 4 is a flow diagram illustrating still another method for distributing cancellation instructions for pending orders for financial articles of trade to one or more liquidity destinations, in accordance with one non-limiting, example embodiment.

FIG. 4 is a flow diagram 400 illustrating another method for distributing cancellation instructions for pending orders for financial articles of trade to one or more liquidity destinations, in accordance with one non-limiting, example embodiment. The collection of market data is performed such that a pre-trade view of the market is possible.

At 410, real-time data is collected from a plurality of sources trading at least one financial article of trade with a plurality of liquidity destinations. The sources are related to, are involved with, or are utilized by a trading entity to facilitate trading with the liquidity destinations. For instance, the transactions of financial articles of trade originate from the trading entity. In a particular non-limiting, example embodiment shown in FIG. 1, the real-time data is collected from one or more front-end collectors 170.

At 420, the real-time data that is collected is normalized into a standardized form. At 430, a condition of a trading market is defined, wherein the trading market includes submitted transactions of financial articles of trade over the plurality of liquidity destinations. For example, conditions of a trading market may include price movement, a current volume in comparison to a normal volume, overall market activity in comparison to a single symbol, etc. In this manner, a pre-trade view of the trading market may be generated that is specifically narrowed to reflect the position of the trading entity. At 440, the defined condition is associated with the entity.

At 450, an event is identified that matches the condition. That is, when analyzing the real-time data that is normalized, parameters of an event within the real-time data may match parameters defining the condition.

At 460, upon recognition of the event, at least one communication session between the trading entity and the corresponding liquidity destination is terminated, as previously described. Specifically, the connection servicing the communication session is logically or physically broken. Termination of the communication session actively forces a process at the corresponding liquidity destination to cancel pending transactions of financial articles of trade originating from that trading entity and delivered over the communication session.

Figure 5:
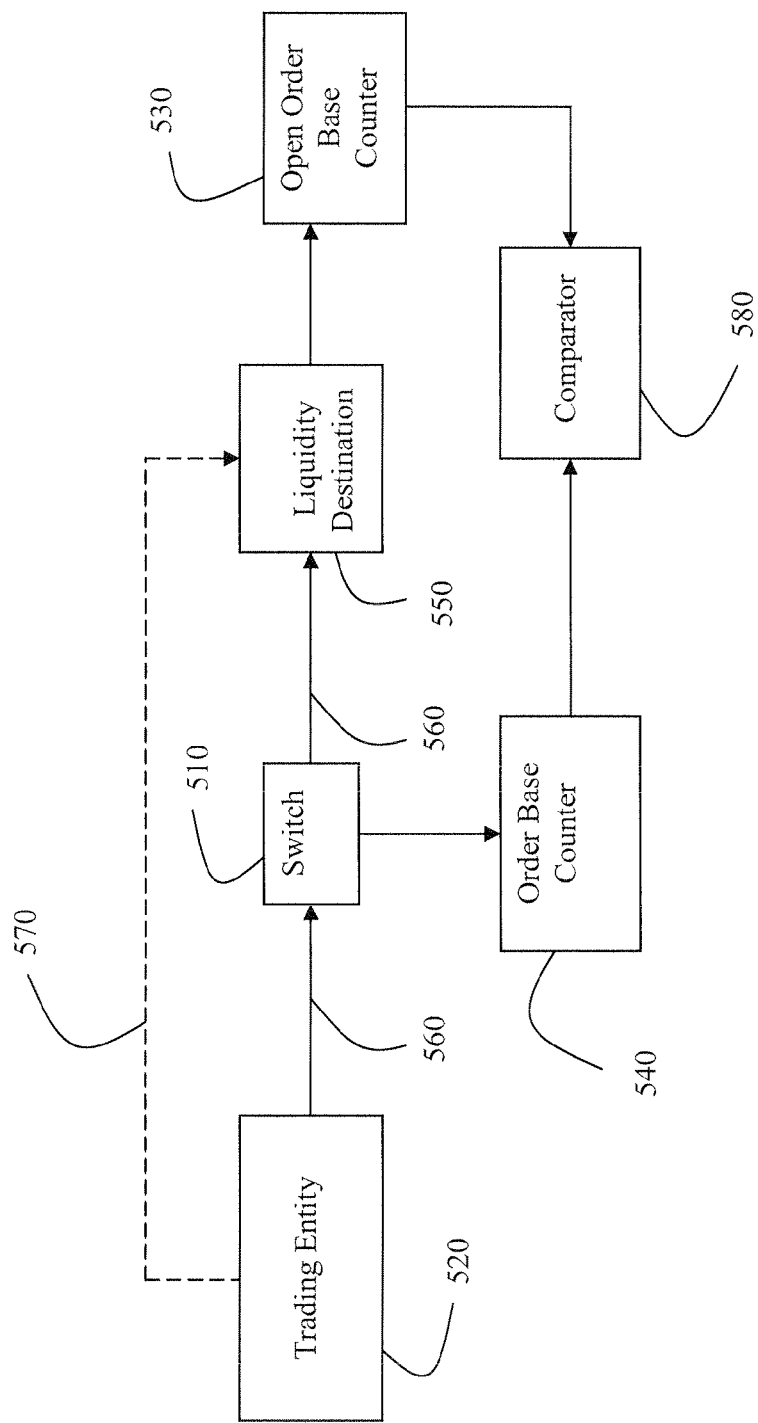
FIG. 5 is an illustration of a system that is capable of determining when a trading entity is bypassing mandatory paths for establishing communication sessions between the trading entity and a liquidity destination, in accordance with one non-limiting, example embodiment.

FIG. 5 illustrates a system 500 for determining whether a trading entity 520 is delivering the entirety of its orders for transactions of financial articles of trade through communication channels, either physical or logical, in accordance with one non-limiting, example embodiment. It is intended for overall performance that the system and methods in FIGS. 1-4 include a trading entity that is fully cooperative, in that all orders for transactions of financial articles of trade be processed through the system 100 of FIG. 1. However, there are instances when the trading entity is not fully cooperative. The system 500 of FIG. 5 helps to identify when the trading entity 520 is bypassing the communication channels between the trading entity 520 and various liquidity destinations 550.

The components of FIG. 5 can be duplicated for multiple liquidity destinations, in various configurations. As such, the system 500 of FIG. 5 is expandable to determine when the trading entity 520 is bypassing any communication channel between the trading entity and any one of a plurality of liquidity destinations.

As shown in FIG. 5, a communication session is established between a trading entity 520 and a liquidity destination 550. Specifically, a connection 560 is made between the trading entity 520 and the liquidity destination 550, where the connection defines a dedicated network path or channel between the two parties. The connection 560 may include one or more physical paths or channels to accommodate for automatic failover. As previously described, a switch component 510 is located on the connection 560 between the trading entity 520 and the liquidity destination 550.

Also shown in FIG. 5 is an alternative connection 570 that bypasses the aforementioned connection or channel 560 between the trading entity and the liquidity destination and where the alternative connection 570 defines a dedicated network path or channel between the two parties and the alternative connection 570 may further include one or more physical or logical paths or channels. The alternative connection 570 supports another communication channel between the trading entity 520 and the liquidity destination 550 that does not include the switch component 510. As such, the trading entity 520 can place orders for transactions of financial articles of trade with that liquidity destination that bypasses the switch component 510.

In FIG. 5, the system 500 includes an open order base counter or analyzer 530 that determines the total number of open or pending orders, so called resting orders, for that trading entity held by the liquidity destination. The counter may perform an actual count or determine statistically through statistical analysis the total number of open/pending/resting orders.

In addition, the system of FIG. 5 includes an order base counter 540 that is associated with the corresponding communication session represented by connection 560. That is, the order base counter 540 is able to determine the total number of orders for a particular period of time being placed with the liquidity destination 550 through the connection 560. The order base counter 560 may perform an actual count or determine through statistical analysis the total number of orders passing through the connection 560. More particularly, the order base counter 540 is affiliated with the switch component 510 and is able to determine the overall flow through the switch component 510. For instance, the order base counter 540 is able to determine how many open orders pass through the switch component 510 that originate from the trading entity 520 over connection 560.

A comparator 580 is able to determine, based on the information from the order base counter 540 and the open order base counter 530, whether all orders for transactions of financial articles of trade originating from the trading entity and placed with the liquidity destination 550 are passing through the switch component 510. Specifically, at a specific moment in time and over a particular period of time, the open order base counter 530 has determined the total number of all orders of transactions of financial articles of trade originating from the trading entity 520 that are attributable, related to, placed, or are being processed by the liquidity destination 550. This value is not dependent on whether the transaction was submitted over the dedicated communication channel or through any bypass channel, since it is determined on information collected and processed at the liquidity destination. This information is sent to the comparator 580. In addition, the order base counter 540 over the same period of time has determined the total number of orders of transactions of financial articles of trade that originate from the trading entity 520, that pass through the switch component 510, and are attributable, related to, places, or are being processed by the liquidity destination 550. This information is also sent to the comparator 580.

In one non-limiting, example embodiment, the comparator 580 is able to determine if the counts for orders from the open order base counter 530 match, correspond, or approximate the order count from the order base counter 540. If the counts do not match, and more specifically, if the count from the open order base counter 530 exceeds the count from the order base counter 540, then it is determined that orders are being placed through one or more alternative connections 570, and corresponding communication sessions, that bypass the switch component 510.

In addition, when an event is determined that necessitates a cancellation of pending/resting orders, a process is initiated that terminates all communication sessions associated with that trading entity. Cancellation is performed on all known communication sessions with one or more liquidity destinations (e.g., liquidity destination 550) through one or more switch components 510, including the communication session associated with connection 560.

As such, upon initiating a cancellation process at the liquidity destination 550 that is in direct response to the termination of the corresponding communication session, pending orders will be canceled and all order flow originating from the trading entity 520 will be prevented from reaching liquidity destination 550 through implementation of the switch component 510. As such, if the open order base counter 530 is still registering new orders being placed with the liquidity destination 550 that originate from the trading entity 520, while the communication session associated with connection 560 is terminated, then it is determined that the orders are being placed through the alternative connection 570, in one non-limiting, example embodiment.

Figure 6:
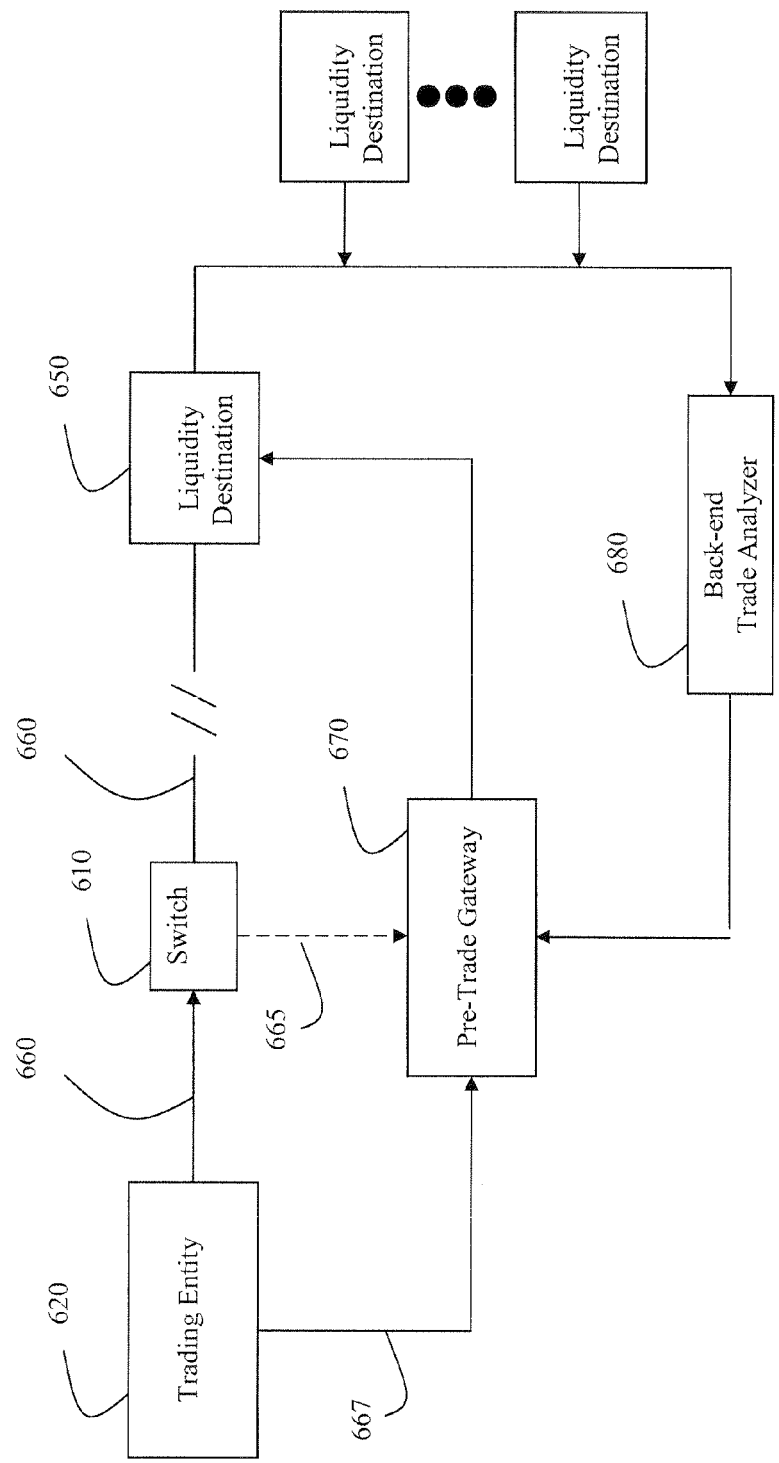
FIG. 6 is an illustration of a system that is capable of performing pre-trade risk analysis prior to sending transactions to corresponding liquidity destinations, in accordance with one non-limiting, example embodiment.

FIG. 6 illustrates a system that provides pre-trade monitoring of trades of a trading entity. In one non-limiting, example embodiment, the system is implemented for the benefit of a trading entity after a hold has been placed on future trading of that trading entity. For instance, after one or more communication sessions facilitating communication between the trading entity and one or more plurality of liquidity destinations have been disabled through the implementation of the switch module, as previously described in FIGS. 1-5, pre-trade monitoring may be initiated to ensure that the trading entity remains in compliance with standards set forth by the trading entity and/or federal regulations.

The system 600 shown in FIG. 6 is expandable and/or distributable to accommodate establishing communication sessions between the trading entity 620 and one or more liquidity destinations. Under various configurations implementing one or more pre-trade gateways 670, communication between the trading entity 620 and one or more liquidity destinations is established to facilitate pre-trade monitoring of future trading activity for that trading entity 620.

As shown in FIG. 6, a pre-existing communication session over connection 660 between the trading entity 620 and a liquidity destination 650 has been terminated through the switch module 610, as represented by the open circuit symbol. The communication session facilitated trading activity between the trading entity 620 and the liquidity destination 650, such as placing orders for transactions of financial articles of trade. Because the pre-existing communication session has been terminated, a process to cancel open or pending orders delivered over the communication session has been initiated at the liquidity destination 650. In addition, the termination of the communication session has effectively halted all future trading by the trading entity 620 with the liquidity destination 650.

The system 600 of FIG. 6 provides an option to open a new communication session or restore the pre-existing communication session, previously serviced by connection or channel 660, so that the trading entity 620 may again engage in trading activity with the liquidity destination 650. In particular, a pre-trade gateway 670, which provides for pre-trade monitoring of trades made on behalf of the trading entity 620, allows for communication to be re-established between the trading entity 620 and the liquidity destination 650.

In one non-limiting, example embodiment, a new communication session is established between the trading entity 620 and the liquidity destination 650 that provides to the trading entity 620 direct access to the liquidity destination 650 without having to go through a participating broker/dealer, or its representatives, such as the clearing house. This reduces any latency introduced by the pre-trade gateway 670 when passing along trades between the trading entity 620 and the liquidity destination 650, especially when trading at high volumes. Also, the new communication session is dedicated to facilitating communication between the trading entity 620 and the liquidity destination 650, and does not support trading from another trading entity, which also reduces any latency introduced by the pre-trade gateway 670.

In one non-limiting, example embodiment, the switch component 610 is included within the network path supporting the new communication session, with all the capabilities of the systems and methods described previously in FIGS. 1-5, in one non-limiting, example embodiment. In another non-limiting, example embodiment, the switch component 610 is not included within the network path or channel supporting the new communication session.

In another non-limiting, example embodiment, the pre-existing communication session between the trading entity and the liquidity destination is restored. However, the restored communication session must now include the pre-trade gateway 670. As shown in FIG. 6, the switch component 610 is included within the network path over connection 665 supporting the now restored communication session, with all the capabilities of the systems and methods described previously in FIGS. 1-5, in one non-limiting, example embodiment. In another non-limiting, example embodiment, the switch component is not included within the network path supporting the restored communication session, as shown over connection 667.

The pre-trade gateway 670 is uniquely positioned to provide control over trades before those trades reach the liquidity destination. That is, the pre-trade gateway 670 is able to decide which transactions should be delivered to the liquidity destination 650. For instance, the pre-trade gateway 670 is able to implement a pre-trade risk strategy that prevents risky trades, as defined by the trading entity 620 or by federal regulations, from reaching the liquidity destination 650. As such, the pre-trade gateway 670 analyzes a current trade made by the trading entity 620 and compares it to rules defining a pre-trade risk. Those rules may define one or more risk limits set on orders, positions, or accounts relating to the trading entity 620. Some rules that define pre-trade risk are discussed below. The discussion to follow is not intended to limit the risk analysis to the rules presented below, but is illustrative of the kind of pre-trade risk analysis that the pre-trade gateway 670 may provide. The gateway 670 of FIG. 6 may implement any type of pre-trade risk analysis, as defined by any type of user-defined rule. Additionally, through the configuration of the system in FIG. 6, the rules or configuration parameters defining the rules may be updated in real-time through the pre-trade gateway 670.

A restricted stock rule provides a list of stocks which the trading entity 620 cannot trade. For instance, trading of these stocks may violate insider trading rules, or self sales regulations. Also, asset classes may be defined that restrict trading of stocks falling within that asset class. An incoming trade is compared to the list to determine if the incoming trade is trading on one of the restricted stocks. This may involve Standard Industrial Classification (SIC) code checking, where the restricted stocks is presented by SIC code, for example. If the stock is restricted for this particular trading group or trading entity 620, the pre-trade gateway 670 is able to prevent the transaction or trade from reaching the liquidity destination 650. The pre-trade gateway 670 will respond with a rejection message that includes the reason for the rejection to the trading entity 620. On the other hand, if the stock is not on the list, then the gateway 670 delivers the transaction to the liquidity destination 650.

A "fat finger" rule prevents inadvertent and mistaken trades from being delivered. For instance, a trader may inadvertently hit the wrong key on a keyboard, such as by entering in too many zeros for a particular order thereby placing an order for a total number of shares that is many times more than originally planned. In one illustrative case, instead of placing an order for one-thousand shares, extra zeroes could increase that order for one-million shares. As such, an order exceeding a certain threshold of shares will be prevented from being placed with the liquidity destination 650.

Along the lines of the "fat finger" rule, a single-order-number (SON) or single-order-quantity (SOQ) rule may be implemented to prevent trades exceeding certain thresholds from being delivered. The SON and SOQ rules establish an upper threshold on a transaction submitted by the trading entity. For instance, the rule may dictate that a single order may not exceed one-thousand shares of a stock. Once the number of shares exceeds one-thousand in the order, the pre-trade gateway prevents delivery of the order to the liquidity destination. On the other hand, if the number of shares does not exceed the threshold, then the transaction is delivered. In still another non-limiting, example embodiment, the SON or SOQ rule is tiered by the share price of the symbol. That is, the SON or SOQ rule may be triggered by the value of the share price. For example, the SON or SOQ rule is triggered once the share price exceeds a certain value, such as four dollars. As such, an order for one-million shares at one-dollar does not trigger the SON or SOQ rule, but an order for one-million shares at five-dollars will trigger the SON or SOQ rule.

In another case, the rule may dictate that a single order may not exceed a monetary value, such as fifty-thousand dollars. Once the value of shares exceeds a threshold for that order, the pre-trade gateway prevents delivery of the order to the liquidity destination. On the other hand, if the value des not exceed the threshold, then the transaction is delivered.

An "easy-to-borrow" rule prevents the trading entity from making trades that cannot be backed up with securities held by the trading entity. For instance, when the trading entity is shorting a stock, the pre-trade gateway is capable of determining if the trading entity has access to that stock in case a call is made for that stock. If there is sufficient access, the pre-trade gateway allows the transaction to be delivered to the liquidity destination. Conversely, if there is not sufficient access, the pre-trade gateway prevents the transaction from being delivered to the liquidity destination.

An account limit rule prevents the trading entity from exceeding the resources held in their account. For instance, if the trading entity is given a credit of three-million dollars by a broker/dealer, the pre-trade gateway is able to determine if the trading entity, when making trades trough that broker/dealer has exceeded their trading limit at the account level across all liquidity destinations in real-time. If the trading limit has been exceeded, then the pre-trade gateway 670 is able to prevent the transaction from being delivered to the liquidity destination 650. On the other hand, if the trading limit has not been exceeded, then the pre-trade gateway 670 allows the transaction to be delivered to the liquidity destination 650.

Other rules may exist to ensure that the trading entity 620 is compliant with Regulation SHO, as dictated by federal restrictions. As such, the pre-trade gateway 670 is implemented to ensure compliance with these regulations.

As shown in FIG. 6, the pre-trade gateway 670 is able to take into account market volatility and intraday activity by the trading entity 620, including the account's overnight and opening positions. In particular, the system 600 includes a back-end trade analyzer 680 that is able to analyze trades as they are occurring (e.g., perform at-trade analysis on submitted transactions), or analyze trades after they have been executed (e.g., provide post-trade analysis on executed transactions). The system 680 in FIG. 6 is integrated with the system 100 of FIG. 1, in one non-limiting, example embodiment in that the back-end trade analyzer 680 component receives collected information from one or more back-end 160 and central collectors 180 that are collecting transactions as they are submitted and/or executed at corresponding liquidity destinations. The back-end trade analyzer 680 is able to perform symbology crosswalking to align varying stock symbols from various liquidity destinations with a particular entity (e.g., entity 620). As such, the pre-trade gateway 670 is able to take into account the general condition of the market, as well as the current position of the trading entity 620, such as taking into account trades made by the trading entity 620 at various liquidity destinations using multiple prime brokers, when determining whether to pass the current transaction to the liquidity destination 650. Some illustrative examples of the rules to consider utilizing information from the back-end trade analyzer 680 is provided below.

For example, concentration breaches can be monitored for the trading entity 620. The pre-trade gateway 670 is able to determine the exposure of the trading entity 620 for a particular stock or sector, or for an overall position of the trading entity 620. In general, the pre-trade gateway 670 is able to determine if there has been an overall breach of the position of the trading entity 620 in a particular stock, sector, or overall. As such, the pre-trade gateway 670 is able to determine if the exposure is too great for a given transaction, and will prevent delivery of that transaction to the liquidity destination 650. On the other hand, if the exposure does not exceed a threshold, then the pre-trade gateway 670 will deliver the transaction to the liquidity destination 650.

A committed capital rule prevents the trading entity 620 from exceeding a capital threshold. The pre-trade gateway 670 is able to consider the current account position of the trading entity 620 by analyzing the entity's overnight position, and current position, as described. If the trade or transaction would force the trading entity 620 to exceed its capital threshold, the trade is prevented from being delivered, otherwise the trade is allowed by the gateway 670 to be delivered to the liquidity destination 650.

In another case, the pre-trade gateway 670 is able to determine if the trading entity 620 has exceeded any type of trading limit. For instance, there may be a limit on the total number of shares, or overall value of shares traded over a certain period. There also may be limits describing the gross market value or net market value of the trading entity 620. If any of those limits has been exceeded, or will be exceeded by the current transaction, then the pre-trade gateway 670 will prevent delivery of the transaction. On the other hand, if that limit has not been exceeded, the transaction will be delivered.

In still another case, the pre-trade gateway 670 is able to consider profits and losses of the trading entity 620. That is, by virtue of information collected and analyzed by the back-end trade analyzer 680, a position of the trading entity 620 as defined by profits and losses may be determined. In addition, thresholds may be set for one or both of profits and losses. As such, the pre-trade gateway 670 is able to determine if any of the profit or loss thresholds has been exceeded, which will determine which transactions are then delivered to the liquidity destination 650. This profit and loss calculation is accomplished at the realized (actual trades on boxed positions) and unrealized levels (one-sided trades against current market state), in one non-limiting, example embodiment.

The pre-trade gateway 670 is able to provide translation of instructions from the trading entity 620, in accordance with one non-limiting, example embodiment. Specifically, the trading entity 620 can deliver trading instructions using any native format familiar to the trading entity 620. The pre-trade gateway 670 is capable of translating those instructions to a format deliverable to the liquidity destination 650.

In one non-limiting, example embodiment, when an offending transaction or trade violates a rule, the pre-trade gateway 670 asks for authorization from the appropriate authority, such as the trading entity 620. After authorization, the pre-trade gateway 670 is able to release the offending transaction for delivery to the liquidity destination 650. For instance, although the offending transaction may violate a "fat finger" rule, the trade may legitimately be trading a larger than expected number of shares, and upon authorization will be passed by the gateway 670 to the liquidity destination 650.

Example embodiments described above enable the cancellation of open/pending orders, "en masse," in a much faster way than was previously possible by utilizing cancel-on-disconnect functionality which typically is implemented in liquidity destinations.

Example embodiments of a system and method for monitoring market transaction activity data from a plurality of liquidity destinations and quickly executing cancellation instructions on pending orders for financial articles of trade with one or more liquidity destinations are thus described. While illustrated and described using specific embodiments, numerous changes and modifications may be made therein without departing from the spirit and scope of the appended claims and equivalents thereof. Furthermore, the claims should not be limited by any of the example embodiments.

The invention claimed is:

1. A method for cancelling pending orders for financial articles of trade, comprising:
   collecting, by one or more collection controllers, data from a plurality of liquidity destinations trading at least one financial article of trade, wherein the data comprises disparate data corresponding to associated liquidity destinations;
   normalizing, by one or more processors, the collected data into a standardized form;
   defining, by one or more processors, a condition of a trading market comprising one or both submitted and executed transactions of financial articles of trade over the plurality of liquidity destinations;
   associating, by one of more processors, the defined condition with an entity;
   identifying, by one or more processors, an event in the trading market matching the condition from the normalized data;
   based on the matching, terminating, by one or more switches, at least one communication session between the entity and a corresponding liquidity destination; and
   cancelling, by one or more processors, pending orders from the entity.

2. The method of claim 1, further comprising initiating a process at the corresponding liquidity destination to cancel the pending transactions.

3. The method of claim 1, wherein the collected data is real-time data.

4. The method of claim 1, wherein the terminating at least one communication session comprises:
   physically de-coupling a connection between the entity and the corresponding liquidity destination, wherein the connection enables the communication session.

5. The method of claim 1, wherein the terminating at least one communication session comprises:
   logically de-coupling a connection between the entity and the corresponding liquidity destination, wherein the connection enables the communication session.

6. The method of claim 1, wherein the terminating at least one communication session comprises:
   invoking a Transmission Control Protocol (TCP) teardown over at least one communication session.

7. The method of claim 1, wherein the terminating at least one communication session comprises:
   terminating a plurality of communication sessions between the entity and the plurality of liquidity destinations.

8. The method of claim 7, wherein the terminating the plurality of communication sessions comprises:
   physically de-coupling a plurality of connections between the entity and the plurality of liquidity destinations, wherein the plurality of connections enables the plurality of communication sessions.

9. The method of claim 8, further comprising:
   determining the plurality of connections between the entity and the plurality of liquidity destinations.

10. The method of claim 7, wherein the terminating the plurality of communication sessions comprises:
    terminating all communication sessions between the entity and the plurality of liquidity destinations.

11. The method of claim 1, wherein the terminating at least one communication session further comprises:
    activating a switch configured to operate in a connection between the entity and the corresponding liquidity destination to physically de-couple the connection between the entity and the corresponding liquidity destination.

12. The method of claim 1, wherein the cancelling comprises:
    forcing a cancel-on-disconnect process at the corresponding liquidity destination.

13. The method of claim 1, wherein the condition is based on transactions of financial articles of trade related to the entity.

14. The method of claim 1, wherein the condition includes transactions of financial articles of trade not related to the entity.

15. The method of claim 7, further comprising:
    determining, from the data, canceled orders related to the entity over the plurality of liquidity destinations;
    determining an open order base of the entity based on the real-time data;
    comparing the open order base to the canceled orders; and
    determining that orders for transactions of financial articles of trade are not submitted through the plurality of communication sessions when the canceled orders do not correspond to the open order base.

16. The method of preceding claim 1, further comprising:
    restoring the at least one communication session through a pre-trade gateway to the corresponding liquidity destination.

17. A method for cancelling pending financial article of trade orders, comprising:
    collecting, by one or more collection controllers, data from a plurality of liquidity destinations trading at least one financial article of trade, wherein the data comprises disparate data corresponding to associated liquidity destinations;
    normalizing, by one or more processors, the collected data collected into a standardized form;
    defining, by one or more processors, a condition of a trading market comprising one or both submitted and executed transactions of financial articles of trade over the plurality of liquidity destinations;
    associating, by one or more processors, the condition defined with an entity;
    identifying, by one or more processors, an event in the trading market matching the condition from the normalized data;
    wherein at least one switch is configured to operate between the entity and the plurality of liquidity destinations over a plurality of connections between the entity and the plurality of liquidity destinations, wherein the plurality of connections facilitate a plurality of sessions between the entity and the plurality of liquidity destinations; and
    stopping, by one or more processors, most or all future trading activity of the entity over the plurality of sessions by the activating the at least one switch.

18. The method of claim 17, wherein the stopping all future trading activity further comprises:

invoking a single action to stop all future trading activity of the entity over the plurality of sessions.

19. The method of any of claim 17, further comprising:
terminating the plurality of communication session between the entity and the plurality of liquidity destinations; and
forcing a process at each of the plurality of liquidity destinations to initiate cancelling of pending transactions from the entity.

20. A method for cancelling pending financial article of trade orders, comprising:
collecting, by one or more collection controllers, data from a plurality of sources trading at least one financial article of trade with a plurality of liquidity destinations;
normalizing, by or more processors, the collected data into a standardized form;
defining, by one or more processors, a condition of a trading market comprising submitted transactions of financial articles of trade over the plurality of liquidity destinations;
associating, by one or more processors, the defined condition with an entity;
identifying, by one or more processors, an event in the trading market matching the condition from the normalized data;
based on the matching, terminating, by one or more switches, at least one communication session between the entity and a corresponding liquidity destination; and
triggering, by one or more processors, an action at the corresponding liquidity destination that cancels pending transactions from the entity.

21. The method of claim 20, wherein the event is based on transactions of financial articles of trade related to the entity.

22. The method of claim 20, wherein the event is based on transactions of financial articles of trade not related to the entity.

23. A system configured to cancel pending financial article of trade orders, comprising:
a communication device configured to set up a communication session between an entity and a liquidity destination, wherein the communication session facilitates trading of at least one financial article of trade;
a connection between the entity and the liquidity destination;
a gateway associated with the connection;
a collector configured to collect data including transactions of financial articles of trade;
an event identifier configured to identify an event matching a defined condition in a trading market comprising one or both of submitted and executed transactions of financial articles of trade over a plurality of liquidity destinations from the collected data, wherein the condition is associated with the entity;
a controller configured to terminate the connection using the gateway when the event is identified.

24. The system of claim 23, wherein the gateway comprises a logical switch.

25. The system of claim 23, wherein the gateway comprises a physical switch.

26. The system of claim 23, wherein the collector is configured to collect real-time data from the plurality of liquidity destinations, wherein the real-time data comprises disparate data corresponding to associated liquidity destinations.

27. The system of claim 23, wherein the collector is configured to collect real-time data from a plurality of sources trading the at least one financial article of trade over the plurality of liquidity destinations.

28. Apparatus configured to cancel pending orders for financial articles of trade, comprising electronic circuitry configured to:
establish a communication session between an entity and a liquidity destination, wherein the communication session facilitates trading of at least one financial article of trade and associate the communication session to a connection between the entity and the liquidity destination, where a switch is associated with the connection;
collect data including transactions of financial articles of trade;
identify an event matching a defined condition in a trading market comprising one or both of submitted and executed transactions of financial articles of trade over a plurality of liquidity destinations from the collected data, wherein the condition is associated with the entity; and
cancel multiple pending transactions from the entity as soon as the event is identified.

29. The apparatus of claim 28, wherein the electronic circuitry is configured to cancel the multiple pending transactions at each of multiple liquidity destinations using a single command.

30. The apparatus of claim 28, wherein the switch is a logical switch or a physical switch, and wherein the collected data is real-time data.

* * * * *